United States Patent
Sugiyama

(10) Patent No.: US 8,606,053 B2
(45) Date of Patent: Dec. 10, 2013

(54) OPTICAL MODULATOR

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 844 days.

(21) Appl. No.: 12/634,793

(22) Filed: Dec. 10, 2009

(65) Prior Publication Data

US 2010/0202722 A1 Aug. 12, 2010

(30) Foreign Application Priority Data

Feb. 10, 2009 (JP) ................................. 2009-029002

(51) Int. Cl.
*G02F 1/035* (2006.01)

(52) U.S. Cl.
USPC ............................................................ 385/2

(58) Field of Classification Search
USPC ................................................. 385/2, 3, 8–10
See application file for complete search history.

(56) References Cited

U.S. PATENT DOCUMENTS

| | | | |
|---|---|---|---|
| 7,058,241 B2 | 6/2006 | Sugiyama et al. | |
| 7,941,011 B2 * | 5/2011 | Doi | 385/3 |
| 2010/0014801 A1 | 1/2010 | Doi | |

FOREIGN PATENT DOCUMENTS

| | | |
|---|---|---|
| WO | 2004/053574 A | 6/2004 |
| WO | WO 2008/117460 A1 | 10/2008 |

* cited by examiner

*Primary Examiner* — Kevin S Wood
(74) *Attorney, Agent, or Firm* — Fujitsu Patent Center

(57) ABSTRACT

In an optical modulator, respective lights for where one input light has been branched, are input via a curved waveguide to a plurality of optical modulation sections arranged in parallel on the same substrate. In a Mach-Zehnder type optical waveguide, a spacing between the pair of branching waveguides of the adjacent optical modulation sections, is formed so as to become wider in the vicinity of a border of an input side polarization inversion region than in the vicinity of a start point of an interaction portion. As a result, even if a signal electrode of the optical modulation sections shifts at the boundary portion of the polarization inversion region, the spacing between the signal electrodes does not become narrow, and hence the radius of curvature of curved waveguides for guiding the input light to the respective optical modulation sections can be increased, so that it becomes possible to apply input light to the optical modulation sections at low loss.

17 Claims, 12 Drawing Sheets

OPTICAL MODULATOR

CROSS-REFERENCE TO RELATED APPLICATION

This application is based upon and claims the benefit of priority of the prior Japanese Patent Application No. 2009-029002, filed on Feb. 10, 2009, the entire contents of which are incorporated herein by reference.

FIELD

The embodiment relates to an optical modulator which is an optical waveguide device used in optical communication, and is configured with an optical waveguide and electrodes formed on a crystal substrate that includes a polarization inversion region.

BACKGROUND

An optical waveguide device that uses an electro-optic crystal such as lithium niobate ($LiNbO_3$) or lithium tantalate ($LiTaO_2$), is formed by forming a metal film of titanium (Ti) or the like on a part of a crystal substrate, to be thermally defused, or to be patterned, after which it is proton exchanged or the like in benzoic acid, to form an optical waveguide, and thereafter an electrode is provided in the vicinity of the optical waveguide. As such an optical waveguide device that uses an electro-optic crystal, there is known for example an optical modulator as illustrated in FIG. 1.

In FIG. 1, an optical waveguide formed on a substrate 100 comprises; an input waveguide 101, a pair of branching waveguides 102 and 103, and an output waveguide 104. A signal electrode 105 and an earth electrode 106 are provided on the pair of branching waveguides 102 and 103, to form a co-planar electrode. In the case where a Z-cut substrate is used, in order to use the refractive index variation due to the electric field in the Z direction, the signal electrode 105 and the earth electrode 106 are arranged directly above the optical waveguides. More specifically, the electrodes are patterned with the signal electrode 105 on the branching waveguide 102, and the earth electrode 106 on the branching waveguide 103. Here in order to prevent the light that is propagated through the branching waveguides 102 and 103 from being absorbed by the signal electrode 105 and the earth electrode 106, a buffer layer (not illustrated in the figure) is provided between the substrate 100, and the signal electrode 105 and the earth electrode 106. For the buffer layer, an oxide silicon ($SiO_2$) or the like of 0.2 to 2 μm thickness is used.

In the case where such an optical modulator is driven at high speed, the output end $105_{out}$ of the signal electrode 105 is connected to the earth electrode 106 via a resistance (not illustrated in the figure) to make a travelling wave electrode, and a microwave electrical signal is applied from the input end $105_{IN}$ of the signal electrode 105. At this time, due to the electric field generated between the signal electrode 105 and the earth electrode 106, the refractive indices of the branching waveguides 102 and 103 respectively change as +na and −nb, so that the phase difference of the light propagated on the branching waveguides 102 and 103 changes. Therefore a signal light that has been intensity modulated by Mach-Zehnder (MZ) interferometer, is output from the output waveguide 104. By changing the cross-section shape of the signal electrode 105 to control the effective refractive index of the microwave electric signal, and by matching propagation speeds of the light and the microwave electric signal with each other, high speed optical response characteristics can be obtained.

In the above optical modulator, one of the two branching waveguides is below the signal electrode while the other is below the earth electrode. Since the electrical field below the earth electrode is weaker than the electric field below the signal electrode, a difference occurs in the phase modulation amount between the two branching waveguides. Therefore, there is not complete push pull in the Mach-Zehnder interferometer, so that the wavelength of the signal light at the instant of switching the signal light from ON to OFF or from OFF to ON changes. That is to say, wavelength chirp occurs.

As a conventional technique for reducing this wavelength chirp, for example as illustrated in FIG. 2, a construction is proposed in which a polarization inversion region Pi in which the polarization direction of a crystal is inverted, is formed on a portion of a section (hereunder referred to as an interaction portion) INT in which light and electric field interact (refer for example to International Publication Pamphlet No. WO 04/053574). In this polarization inversion region Pi, the direction of change of the refractive index when an electric field is applied to the signal electrode 105 is opposite to that for the remaining regions Pn (non-polarization inversion regions) of the interaction portion INT. In the boundary portion between the polarization inversion region Pi and the non-polarization inversion region Pn, the positional relationship of the signal electrode 105 and the earth electrode 106 with respect to the pair of branching waveguides 102 and 103 is switched. Due to this configuration, the aforementioned difference in the phase modulation amounts that are respectively generated by the polarization inversion region Pi and the non-polarization inversion region Pn is cancelled out. Therefore it is possible to reduce the wavelength chirp of the modulation light.

Incidentally, due to the variety of recent optical modulation formats (for example multi-valued modulation format, optical polarization division multiplexing format, and the like), there are many cases where signals corresponding to a desired optical modulation format are generated, by combining a number of conventional optical modulators such as illustrated in FIG. 1 and FIG. 2. In this case, in order to reduce the size of the overall optical modulator, a plurality of optical modulators are integrated on a single chip. In the following description, individual optical modulator integrated on a single chip is referred to as "an optical modulation section".

In the case where a plurality of optical modulation sections are arranged in parallel on a single chip, care is required so that cross talk does not occur between electrodes in the adjacent optical modulation sections. Furthermore, if the earth electrode disposed between the optical modulation sections is narrow, earthing becomes insufficient. Therefore it is necessary to have a sufficient spacing between adjacent optical modulation sections. In particular, in the case where the optical modulation sections include a polarization inversion region as illustrated before in FIG. 2, shifting the signal electrodes in the border portion between the polarization inversion region and the non-polarization inversion region, can make the spacing between the signal electrodes in the adjacent optical modulation sections narrow. Therefore it is necessary to further open up the spacing in the optical modulation sections.

More specially, as illustrated for example in FIG. 3, a configuration is assumed in which two optical modulation sections 100A and 100B are arranged in parallel on the same substrate, and the positions of the boundary portion between the polarization inversion region Pi and the non-polarization inversion region Pn are displaced for the respective optical modulation sections 100A and 100B, in the lengthwise direction of the substrate. In this configuration, a spacing S between the signal electrode 105A of the optical modulation section 100A and the signal electrode 105B of the optical modulation section 100B is narrowed to S' in the border portion enclosed by the dotted line in the figure. Therefore, it is necessary to widen the spacing between a branching waveguide 103A of the optical modulation section 100A and a branching waveguide 102B of the optical modulation section 100B that is adjacent to the branching waveguide 103A, so as to obtain sufficient earthing in the abovementioned border portion. As is also clear from this specific example, there is a certain limit to miniaturization of the overall optical modulator by integrating a plurality of optical modulators on a single chip.

Furthermore, focusing on the configuration of an optical waveguide for applying input light to respective optical modulating sections arranged in parallel on a single chip, then as illustrated by the configuration example of FIG. 3, in the case where the single optical waveguide 111 is branched into two optical waveguides 113A and 113B by the optical branching section 112, and connected to the input waveguides 101A and 101B of the respective optical modulation sections, the light output from a single light source (not illustrated in the figure) can be applied to the respective optical modulation sections 100A and 100B. In this case, it is possible to simplify the configuration of an optical transmission apparatus that includes a light source and an optical modulator.

However, in the configuration of the above optical modulator, if the spacing between the respective optical modulation section 100A and 100B becomes wide, it becomes necessary to make the radii of curvature of the curved waveguides 113A and 113B of approximate S shapes that connect between the optical branching section 112 and the input waveguides 101A and 101B of the respective optical modulation sections, small. Therefore the increase in the bend loss (radiation loss) in the respective curved optical waveguides 113A and 113B becomes a problem. If the radii of curvature are increased in order to suppress the increase in the bend loss, the length of the respective curved waveguides 113A and 113B (the distance between the branching section 112 and the respective optical modulation sections 100A and 100B) becomes long, so that the size in the length direction of the optical modulator becomes great. Normally, the overall length in the lengthwise direction of a single chip is restricted to the size of the wafer or the like from which the chip is cut. Therefore if the overall length of the chip cannot be extended to correspond to the extension amount of the respective curved waveguides 113A and 113B, the interaction portion INT of the respective optical modulation sections 100A and 100B must be shortened. If the interaction portion INT is shortened, the drive voltage increases, and hence a high output driver amplifier is necessary. As a result, the cost and power consumption of the optical modulator is increased.

SUMMARY

According to an aspect of the invention, an optical modulator includes at least two optical modulation sections which are arranged in parallel on a same substrate having an electro-optic effect, in the respective optical modulation sections, a Mach-Zehnder type optical waveguide is formed on the substrate, and a signal electrode and an earth electrode are provided along a pair of branching waveguides that are disposed between an optical branching section and an optical multiplexing section of the Mach-Zehnder type optical waveguide, that perform modulation of light that propagates on the Mach-Zehnder type optical waveguide by applying an electric signal corresponding to modulation data to the signal electrode that is a travelling wave electrode. The substrate of this optical modulator, in the respective optical modulation sections, has in an interaction portion in which light propagating on the pair of branching waveguides and an electrical signal propagating on the signal electrode interact with each other, and a polarization inversion region in which a polarization direction in one region is inverted with respect to a polarization direction in the other region. Furthermore, in the respective optical modulation sections, respective branch lights for where light input to one input port that is common to both is branched into a plurality, are guided to an input end of the Mach-Zehnder type optical waveguide via curved optical waveguides corresponding to each of the optical modulation sections. Moreover, the signal electrodes of the respective optical modulation sections are respectively arranged, within a polarization inversion region of the interaction portion, on one branching waveguide out of the pair of branching waveguides, and within a non-polarization inversion region in which there is no polarization inversion in the interaction portion, on an other branching waveguide. Furthermore, for each of the pair of branching waveguides of the respective optical modulation sections, for a spacing to a pair of branching waveguides of the other optical modulation section that is adjacent on the substrate, a spacing in the vicinity of a border on an input side between the polarization inversion region and the non-polarization inversion region is wider than a spacing in the vicinity of a start point of the interaction portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereunder is a detailed description of embodiments of the invention, with reference to the drawings.

Figure 4:
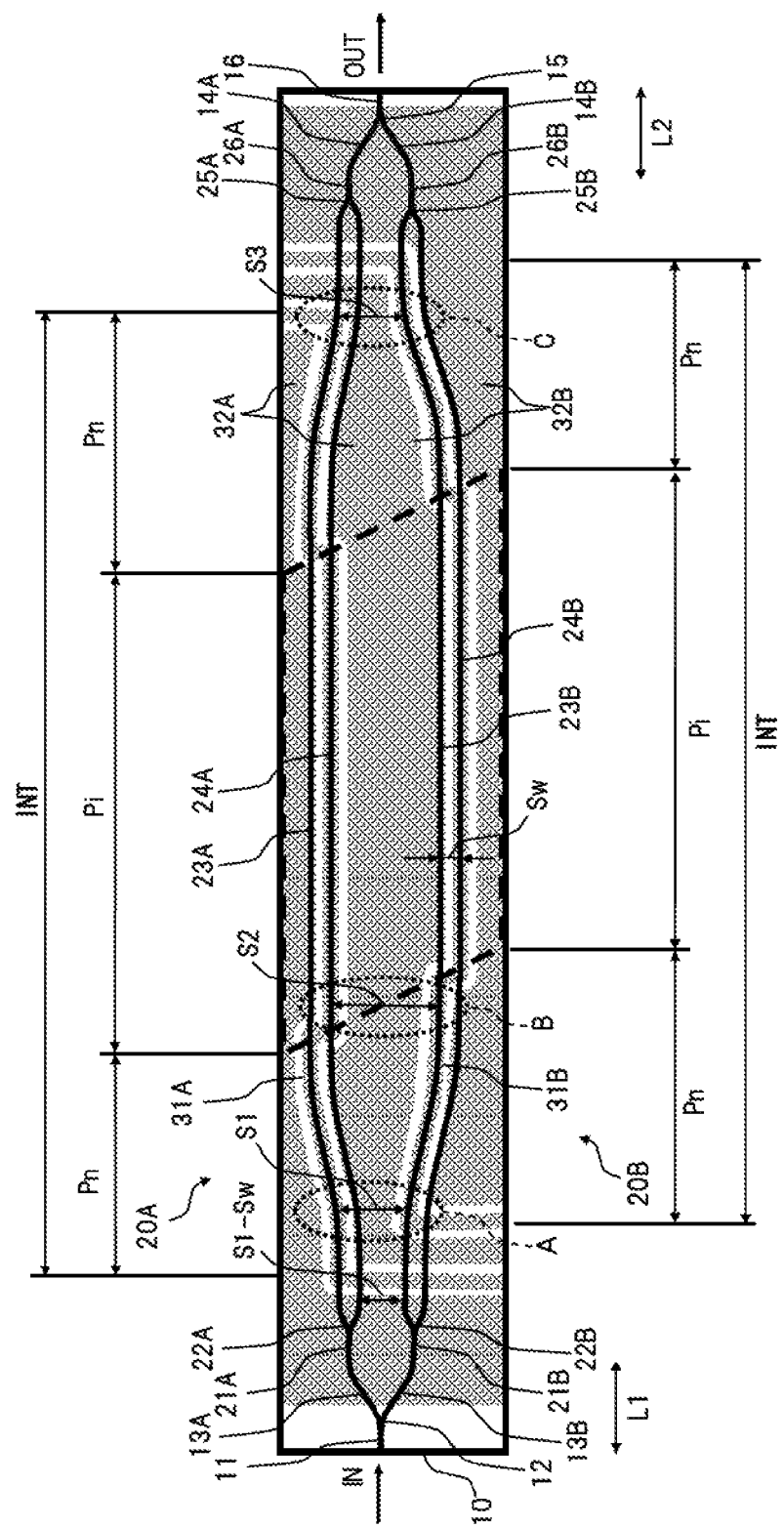
FIG. 4 is a plan view illustrating a configuration of an optical modulator according to a first embodiment.

FIG. 4 is a plan view illustrating a configuration of an optical modulator according to a first embodiment.

In FIG. 4, in the optical modulator of this embodiment, on a single crystal substrate 10 of, for example, $LiNbO_3$ or $LiTaO_2$ having an electro-optic effect, there is arranged in parallel, two optical modulation sections 20A and 20B. For the substrate 10, here a Z-cut crystal that is cut in a rectangle shape is used, and on a lengthwise central portion thereof is formed a polarization inversion region Pi. This optical modulator is provided with one input port IN and one output port OUT, and one end of a single input waveguide 11 is connected to the input port IN. The other end of the input waveguide 11 is connected to an input end of an optical branching section 12, and to the two output ends of the optical branching section 12 are respectively connected input ends of the respective optical modulation sections 20A and 20B via curved waveguides 13A and 13B. The optical branching section 12 branches the input light into two at a required intensity ratio and outputs this.

The optical modulation section 20A is formed with a polarization inversion region Pi and non-polarization inversion regions Pn that are extended across the surface portion located on the upper side in the figure of the substrate 10, and is provided with: a Mach-Zehnder (MZ) type optical waveguide comprising an input waveguide 21A, an optical branching section 22A, a pair of branching waveguides 23A and 24A, an optical multiplexing section 25A, and an output waveguide 26A; and a signal electrode 31A and an earth electrode 32A that are patterned along the pair of branching waveguides 23A and 24A.

The input waveguide 21A has one end connected to the curved waveguide 13A, and to the other end is connected the input end of the optical branching section 22A.

In the optical branching section 22A, light propagated on the input waveguide 21A is branched into two at an intensity ratio of 1:1. To the two output ends of the optical branching section 22A is respectively connected each end of the pair of branching waveguides 23A and 24A.

Regarding the pair of branching waveguides 23A and 24A, the branching waveguide 23A disposed on the upper side in the figure, and the branching waveguide 24A disposed on the lower side in the figure, are arranged in parallel with the longitudinal direction of the substrate 10. In the respective branching waveguides 23A and 24A, the part disposed from between one end connected to the optical branching section 22A to the border between the non-polarization inversion region Pn and the polarization inversion region Pi on the input side, becomes a gentle approximate S shape curved waveguide separating from the branching waveguides 23B and 24B of the parallel optical modulation section 20B, as it approaches the polarization inversion region Pi. Furthermore, the part disposed within the polarization inversion region Pi becomes a parallel linear waveguide in the longitudinal direction of the substrate 10. Moreover, the part disposed between from the border between the polarization inversion region Pi and the non-polarization inversion region Pn on the output side, to the other end connected to the optical multiplexing section 25A, becomes a gentle approximate S shape curved waveguide approaching the branching waveguides 23B and 24B of the parallel modulation section 20B, as it approaches the optical multiplexing section 25A. The spacing between the pair of branching waveguides 23A and 24A is here constant from the one end connected to the optical branching section 22A to the other end connected to the optical multiplexing section 25A.

In the optical multiplexing section 25A, the two input ends are respectively connected to the other ends of the branching waveguides 23A and 24A, and the lights propagated on the branching waveguides 23A and 24A are multiplexed into one. To the one output end of the optical multiplexing section 25A is connected the one end of the output waveguide 26A.

The signal electrode 31A is formed along directly above the branching waveguide 23A within the non-polarization inversion region Pn on the input side, and is shifted from the branching waveguide 23A side to the branching waveguide 24A side in the boundary portion between the non-polarization inversion region Pn and the polarization inversion region Pi on the input side, and is formed along directly above the branching waveguide 24A within the polarization inversion region Pi. Furthermore, the signal electrode 31A, in the boundary portion between the polarization inversion region Pi and the non-polarization inversion region Pn on the output side, is shifted from the branching waveguide 24A side to the branching waveguide 23A side, and is formed along directly above the branching waveguide 23A within the non-polarization inversion region Pn on the output side.

The earth electrode 32A is separated from the signal electrode 31A, and also is formed to include the portion along directly above the branching waveguide 23A within the polarization inversion region Pi, and the portion along directly above the branching waveguide 24A within the respective non-polarization inversion regions Pn on the input side and the output side. Here the earth electrode 32A formed between the branching waveguide 24A and a later described branching waveguide 23B of the optical modulation section 20B, is common to a later described earth electrode 32B of the optical modulation section 20B.

The signal electrode 31A constitutes a travelling wave electrode in which an output end leading to one side face (the side face on the upper side in the figure) of the parallel opposing side faces in the longitudinal direction of the substrate 10, is connected to the earth electrode 32A via a resistor (not illustrated in the figure), and a microwave electric signal (electric signal corresponding to modulation data) is applied from the input end leading to the other side face (the side face on the lower side in the figure) of the substrate 10. For the signal electrode 31A and the earth electrode 32A, these may be formed on the substrate 10 (optical waveguide) via a buffer layer that uses $SiO_2$ or the like (not illustrated in the figure). By providing a buffer layer, the light propagated within the branching waveguides 23A and 24A can be prevented from being absorbed by the signal electrode 31A and the earth electrode 32A.

The optical modulation section 20B is formed with a polarization inversion region Pi and non-polarization inversion regions Pn that are extended across the surface portion located on the lower side in the figure of the substrate 10, and is provided with: a Mach-Zehnder (MZ) type optical waveguide comprising an input waveguide 21B, an optical branching section 22B, a pair of branching waveguides 23B and 24B, an optical multiplexing section 25B, and an output waveguide 26B; and a signal electrode 31B and an earth electrode 32B that are patterned along the pair of branching waveguides 23B and 24B.

In the present embodiment, the MZ type optical waveguide of the optical modulation section 20A and the MZ type optical waveguide of the optical modulation section 20B have a symmetrical relationship on either side of an axis parallel with the longitudinal direction of the substrate 10. Furthermore, the locations of the boundary portions between the polarization inversion region Pi and the non-polarization inversion regions Pn for the signal electrode 31B and the earth electrode 32B of the optical modulation section 20B, are displaced in the longitudinal direction of the substrate 10 with respect to the locations for the signal electrode 31A and the earth electrode 32A of the optical modulation section 20A (the shape of the polarization inversion region Pi is a parallelogram). Therefore this becomes a pattern that is shifted in the longitudinal direction of the substrate 10.

The input waveguide 21B has one end connected to the curved waveguide 13B, and to the other end is connected the input end of the optical branching section 22B.

In the optical branching section 22B, light propagated on the input waveguide 21B is branched into two at an intensity ratio of 1:1. To the two output ends of the optical branching section 22B is respectively connected each end of the pair of branching waveguides 23B and 24B.

Regarding the pair of branching waveguides 23B and 24B, the branching waveguide 23B disposed on the upper side in the figure, and the branching waveguide 24B disposed on the lower side in the figure, are arranged in parallel with the longitudinal direction of the substrate 10. In the respective branching waveguides 23B and 24B, the part disposed from between one end connected to the optical branching section 22B to the border between the non-polarization inversion region Pn and the polarization inversion region Pi on the input side, becomes a gentle approximate S shape curved waveguide separating from the branching waveguides 23A and 24A of the parallel optical modulation section 20A, as it approaches the polarization inversion region Pi. Furthermore, the part disposed within the polarization inversion region Pi becomes a parallel linear waveguide in the longitudinal direction of the substrate 10. Moreover, the part disposed between from the border between the polarization inversion region Pi and the non-polarization inversion region Pn on the output side, to the other end connected to the optical multiplexing section 25B, becomes a gentle approximate S shape curved waveguide approaching the branching waveguides 23A and 24A of the parallel modulation section 20A, as it approaches the optical multiplexing section 25B. The spacing between the pair of branching waveguides 23B and 24B is here constant from the one end connected to the optical branching section 22B to the other end connected to the optical multiplexing section 25B.

In the optical multiplexing section 25B, the two input ends are respectively connected to the other ends of the branching waveguides 23B and 24B, and the lights propagated on the branching waveguides 23B and 24B are multiplexed into one. To the one output end of the optical multiplexing section 25B is connected the one end of the output waveguide 26B.

The signal electrode 31B is formed along directly above the branching waveguide 23B within the non-polarization inversion region Pn on the input side, and is shifted from the branching waveguide 23B side to the branching waveguide 24B side in the boundary portion between the non-polarization inversion region Pn and the polarization inversion region Pi on the input side, and is formed along directly above the branching waveguide 24B within the polarization inversion region Pi. Furthermore, the signal electrode 31B, in the boundary portion between the polarization inversion region Pi and the non-polarization inversion region Pn on the output side, is shifted from the branching waveguide 24B side to the branching waveguide 23B side, and is formed along directly above the branching waveguide 23B within the non-polarization inversion region Pn on the output side.

The earth electrode 32B is separated from the signal electrode 31B, and also is formed to include the portion along directly above the branching waveguide 23B within the polarization inversion region Pi, and the portion along directly above the branching waveguide 24B within the respective non-polarization inversion regions Pn on the input side and the output side. Here the earth electrode 32B formed between the branching waveguide 23B and the branching waveguide 24A of the optical modulation section 20A, is common to the earth electrode 32A of the optical modulation section 20A.

The signal electrode 31B constitutes a travelling wave electrode in which an output end leading to one side (the side face on the upper side in the figure) of the parallel opposing side faces in the longitudinal direction of the substrate 10, is connected to the earth electrode 32B via a resistor (not illustrated in the figure), and a microwave electric signal (electric signal corresponding to modulation data) is applied from the input end leading to the other side face (the side face on the lower side in the figure) of the substrate 10. Also for the signal electrode 31B and the earth electrode 32B, these may be formed on the substrate 10 (optical waveguide) via a buffer layer in the same way as for the aforementioned case.

The other ends of the output waveguides 26A and 26B in the optical modulation sections 20A and 20B are connected to the two input ends of an optical multiplexing section 15 via curved waveguides 14A and 14B. The optical multiplexing section 15 multiplexes each of the signal lights that have been modulated by the optical modulation sections 20A and 20B, into one. The output end of the optical multiplexing section 15 is connected to one end of a single output waveguide 16, and to the other end of the output waveguide 16 is connected the output port OUT. In the case where the present optical modulator corresponds to an optical polarization division multiplexing type, the output lights from the optical modulation sections 20A and 20B are made orthogonal to the polarization surface, and input to the optical multiplexing section 15, and in the optical multiplexing section 15, polarization multiplexing is performed, and the polarization division multiplexed light is output to the output waveguide 16.

In the optical modulation section 20A and 20B configured as described above, each of the spacings (the spacings in the direction orthogonal to the longitudinal direction of the substrate 10, between the mutually adjacent branching waveguides) becomes wider in the vicinity of the border between the non-polarization inversion region Pn and the polarization inversion region Pi on the input side, than in each of the vicinity of the start point and the vicinity of the end point of the interaction section INT.

More specifically, in relation to the spacing of the optical modulation sections 20A and 20B, from the view point of suppressing cross talk, in the respective locations in the longitudinal direction of the substrate 10 attention is paid to the spacing between the signal electrode 31A of the optical modulation section 20A and the signal electrode 31B of the optical modulation section 20B. Here the spacing of the signal electrodes 31A and 31B in the vicinity of the start point (the part A surrounded by the dotted line in the figure) of the interaction portion INT of the optical modulation sections 20A and 20B is made S1. Furthermore, in the vicinity of the border (the part B surrounded by the dotted line in the figure)

of the non-polarization inversion region Pn and the polarization inversion region Pi on the input side, the spacing between; the signal electrode 31A after shifting from the branching waveguide 23A side of the optical modulation section 20A to the branching waveguide 24A side, and the signal electrode 31B before shifting from the branching waveguide 23B side of the optical modulation section 20B to the branching waveguide 24B side is made S2. Furthermore, the spacing between the signal electrodes 31A and 31B in the vicinity of the end point (the part C surrounded by the dotted line in the figure) of the interaction portion INT of the optical modulation sections 20A and 20B is made S3.

Figure 3:
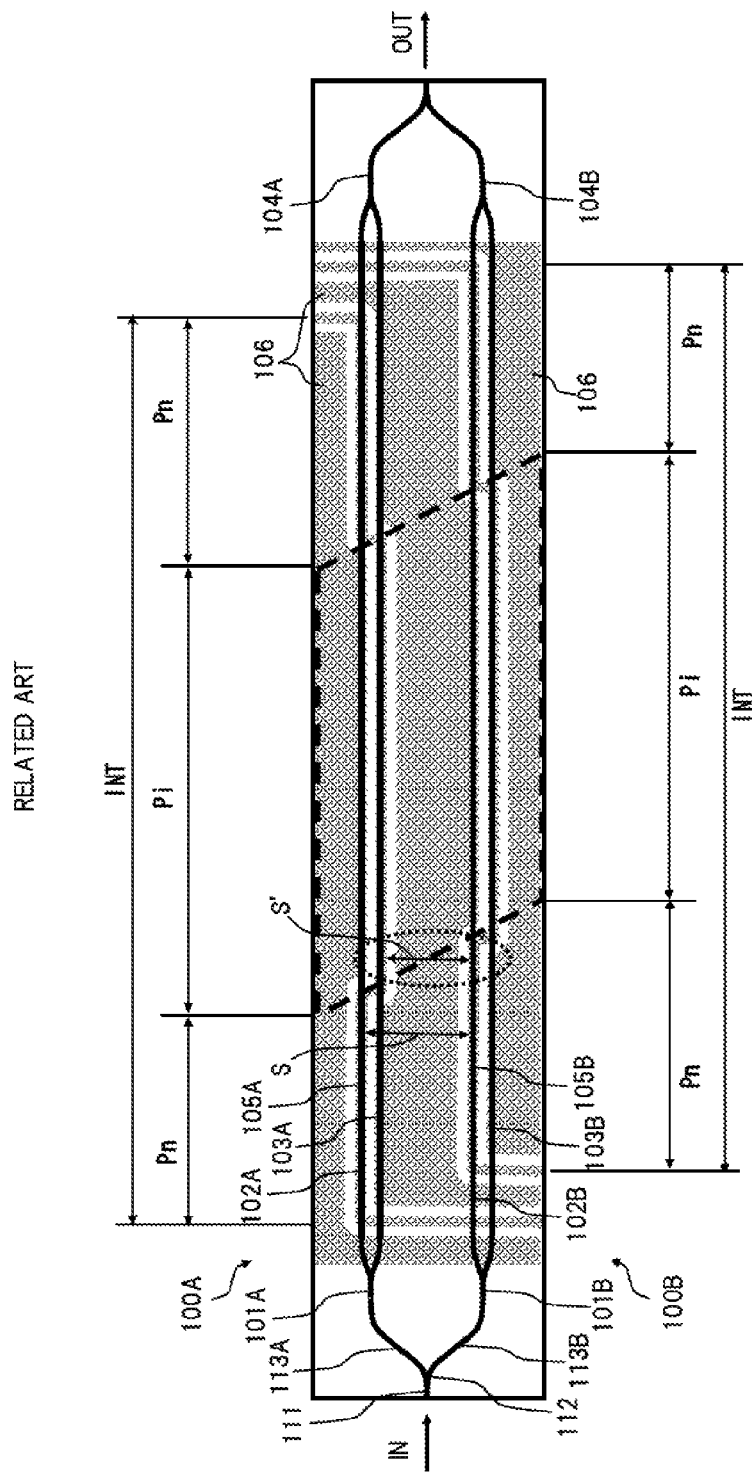
FIG. 3 is a plan view illustrating a configuration example for a case where optical modulation sections of a conventional configuration are arranged in two parallel lines on a single substrate.

At this time, the spacing S2 of the signal electrodes 31A and 31B in the vicinity of the border B of the polarization inversion is greater than or equal to the spacing S1 of the signal electrodes 31A and 31B in the vicinity of the start point A of the interaction portion INT (S2≥S1). That is, the branching waveguides 23A and 24A of the optical modulation section 20A and the branching waveguides 23B and 24B of the optical modulation section 20B become separated from each other with approach from the vicinity of the start point A of the interaction portion INT to the vicinity of the border B of the polarization inversion. As a result, the spacing S2 in the vicinity of the border B of the polarization inversion does not become narrow as with the conventional configuration illustrated before in FIG. 3, but becomes the same as the spacing S1 in the vicinity of the start point A of the interaction portion INT, or becomes wider than the spacing S1. In other words, in the case where the spacing of the pair of branching waveguides of the respective polarization modulation sections is made Sw, in the conventional configuration, the spacing of the signal electrodes of the respective optical modulation sections in the vicinity of the border of the polarization inversion becomes narrower by just Sw. Therefore considering this part, in the present embodiment, ingenuity is applied to the patterning of the branching waveguide 23A, 24A, 23B, and 24B of the respective optical modulation sections 20A and 20B, so that the spacing of the optical modulation sections 20A and 20B in the vicinity of the border of the polarization inversion becomes wider than in the vicinity of the start point of the interaction portion INT by greater than or equal to Sw.

Furthermore, the spacing S2 of the signal electrodes 31A and 31B in the vicinity of the border B of the polarization inversion also becomes greater than or equal to the spacing S3 of the respective signal electrodes 31A and 31B in the vicinity of the end point C of the interaction portion INT (S2≥S3). That is, the branching waveguides 23A and 24A of the optical modulation section 20A and the branching waveguides 23B and 24B of the optical modulation section 20B approach each other with approach from the vicinity of the border on the output side of the polarization inversion to the vicinity of the end point C of the interaction portion INT, and as a result the spacing S2 in the vicinity of the border B of the polarization inversion becomes the same as the spacing S3 in the vicinity of the finish point C of the interaction portion INT, or becomes wider than the spacing S3.

Consequently, even if the signal electrodes 31A and 31B are bent in the vicinity of the border of the polarization inversion, the situation where each of the spacings becomes narrower than in the vicinity of the start point and in the vicinity of the finish point of the interaction portion INT is avoided. Therefore, there is no longer the situation as in the conventional configuration where, because the optical modulation sections 20A and 20B include the polarization inversion region Pi, the spacing of the optical modulation sections 20A and 20B must be wide. In other words, even if the optical modulation sections 20A and 20B include the polarization inversion region Pi, the spacing of the respective optical modulation sections 20A and 20B can be made the same as for when the polarization inversion region Pi is not included.

As a result, for the curved waveguides 13A and 13B for guiding the input light to the present optical modulator, to the respective optical modulation sections 20A and 20B, the situation where the bend loss is increased due to the small radius of curvature can be avoided. Alternatively, the situation where the optical modulator becomes larger due to extending the length of the curved waveguides 13A and 13B in the longitudinal direction of the substrate 10, and where the interaction portion INT becomes short inviting an increase in drive voltage, can be avoided. That is, in the present optical modulator, the length L1 (refer to FIG. 4) of the optical waveguide (the input waveguide 11, the optical branching section 12, and the curved waveguides 13A and 13B) for guiding one input light to the optical modulation sections 20A and 20B is shortened. This situation is also the same for the curved waveguides 14A and 14B for guiding the signal light modulated by the respective optical modulation sections 20A and 20B to the optical multiplexing section 15, where the length L2 of the curved waveguides 14A and 14B, the optical multiplexing section 15, and the output waveguide 16 is shortened.

Furthermore, concerning the spacings S1 to S3 of the respective signal electrodes 31A and 31B, by designing the optical waveguide pattern of the optical modulation sections 20A and 20B so that the relationship of S1=S2=S3 holds, it is also possible to minimize the size in the direction orthogonal to the longitudinal direction of the substrate 10. The necessary spacing of the signal electrodes 31A and 31B is determined corresponding to the minimum width of the earth electrode for which earthing can be substantially obtained, and to the spacing between the signal electrodes to suppress cross talk of the microwave electric signal. This can be appropriately determined corresponding to the frequency spectrum of the microwave electric signal. More specifically, in the case of an optical modulator having a modulation bandwidth greater than 30 GHz for example, it is possible to set the spacing of the respective signal electrodes 31A and 31B, with the minimum width of the earth electrode the same as the width of the signal electrode, and with the earth electrodes located between the optical modulation sections 20A and 20B each formed common.

Next is a description of the operation of the optical modulator according to a first embodiment.

At first, output light from a single light source or the like is input to the input waveguide 11 from the input port IN of the present optical modulator. The input light is input to the optical branching section 12 through the input waveguide 11, and bifurcated according to a required intensity ratio. One of the branched lights output from the optical branching section 12 is input to the input waveguide 21A of the optical modulation section 20A through the curved waveguide 13A, and the other branched light is input to the input waveguide 21B of the optical modulation section 20B through the curved waveguide 13B. At this time, the light input to the respective optical modulation sections 20A and 20B is attenuated due to the bend loss in the curved waveguides 13A and 13B. However, in the configuration of the present optical modulator, the spacing of the optical modulation sections 20A and 20B is set narrow in a range where cross talk can be suppressed, so that the radii of curvature of the respective curved waveguides 13A and 13B become relatively large values. Therefore attenuation of the input light due to the bend loss is only slight or practically nonexistent.

In the optical modulation section 20A (20B), the light input to the input waveguide 21A (21B) is bifurcated in the optical branching section 22A (22B) according to an intensity ratio of 1:1, and respectively sent to the branching waveguides 23A and 24A (23B and 24B). Here, by applying a microwave electric signal from the input end of the signal electrode 31A (31B), light that has been modulated corresponding to the level of the microwave electric signal is output from the output waveguide 26A (26B). In this modulation light, the difference in the phase modulation amount that is respectively generated by the polarization inversion region Pi and the non-polarization inversion region Pn is cancelled out, thus giving light for which the wavelength chirp is reduced.

The output light from the optical modulation sections 20A and 20B is input to the optical multiplexing section 15 through the curved waveguides 14A and 14B, and multiplexed into a single signal light. At this time also, the respective lights input to the optical multiplexing section 15 are attenuated due to the bend loss in the curved waveguides 14A and 14B. However, in the same way as for the case of the aforementioned curved waveguides 13A and 13B, attenuation of the respective lights due to the bend loss is only slight or practically nonexistent. The signal light multiplexed by the optical multiplexing section 15 passes through the output waveguide 16 and is output to the outside from the output port OUT.

According to the optical modulator of the above described present embodiment, even in the case where two optical modulation sections 20A and 20B are arranged in parallel on the substrate 10 that includes the polarization inversion region Pi, common input light can be applied at low loss to the respective optical modulation sections of a small size configuration, so that it is possible to generate signal light in which wavelength chirp has been reduced, at low cost.

In the above first embodiment, the configuration example is shown for where the light that is modulated in the optical modulation sections 20A and 20B is applied to the optical multiplexing section 15 via the curved waveguides 14A and 14B and multiplexed into one. However the configuration may be such that the modulation light of the optical modulation sections 20A and 20B is not multiplexed and is output separately.

Furthermore, in the above present embodiment, the example is shown for where the signal electrodes 31A and 31B of the optical modulation sections 20A and 20B, in the boundary portion between the non-polarization inversion region Pn and the polarization inversion region Pi on the input side, are shifted in the same direction from the branching waveguides 23A and 23B side to the branching waveguides 24A and 24B side. However the invention is not limited to this. For example, as illustrated in FIG. 5, the configuration of the invention is effective also in the case where the signal electrode 31A of the optical modulation section 20A is shifted from the branching waveguide 23A side to the branching waveguide 24A side, while the signal electrode 31B' of the optical modulation section 20B is shifted in the opposite direction from the branching waveguide 24B side to the branching waveguide 23B side.

Figure 5:
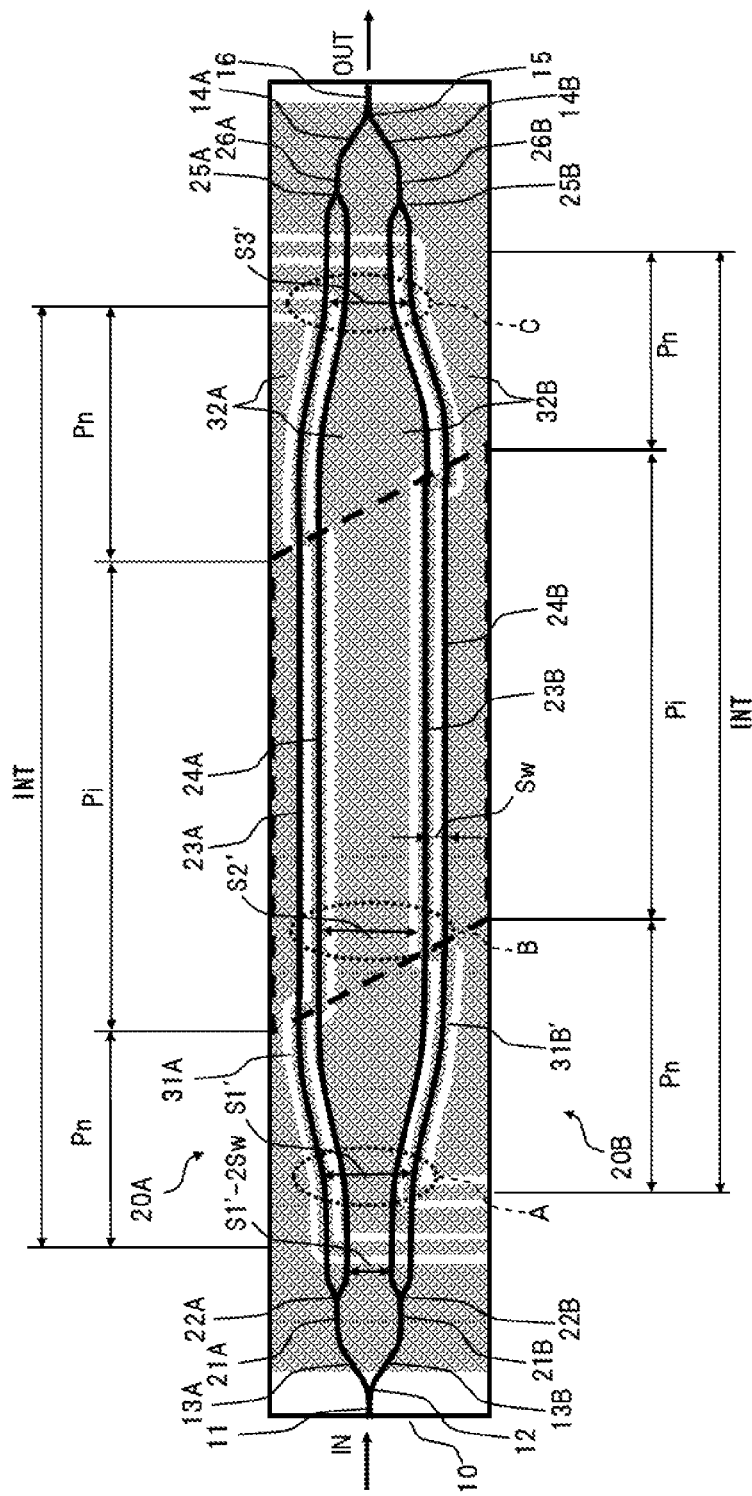
FIG. 5 is a plan view illustrating a configuration of a modified example related to the first embodiment.

In the configuration of FIG. 5, the spacing S2' for after the signal electrodes 31A and 31B' have been shifted in opposite directions becomes narrow. However due to the branching waveguides 24A and 23B separating from each other going from the vicinity of the start point A of the interaction portion INT towards to the vicinity of the border B of the polarization inversion, the spacing S2' of the signal electrodes 31A and 31B' after shifting becomes greater than or equal to the spacing S1' in the vicinity of the start point A of the interaction portion INT (S2'≥S1'). This relationship is also the same for the spacing S3' in the vicinity of the finish point C of the interaction portion INT (S2'≥S3').

Furthermore, in the above configuration of FIG. 5, if the spacing of the pair of branching waveguides of each optical modulation section is Sw, then the spacing of the optical modulation sections 20A and 20B in the vicinity of the start point A of the interaction portion INT (the spacing between the branching waveguide 24A and the branching waveguide 23B) becomes S1'−2×Sw. On the other hand, in the aforementioned first embodiment illustrated in FIG. 4, the spacing of the optical modulation sections 20A and 20B in the vicinity of the start point A of the interaction portion INT is S1−Sw. Consequently, if the aforementioned required spacing of the signal electrodes is made the same in the respective configurations of FIG. 4 and FIG. 5 (S1=S1'), then by applying the configuration of FIG. 5, the length L1 of the input waveguide 11, the optical branching section 12, and the curved waveguides 13A and 13B can be made even shorter. Similarly to this, since the spacing of the optical modulation sections 20A and 20B in the vicinity of the start point C of the interaction portion INT also becomes S3'−2×Sw, then the length L2 of the curved waveguides 14A and 14B, the optical multiplexing section 15, and the output waveguide 16 can be made even shorter.

Next is a description of a second embodiment.

Figure 6:
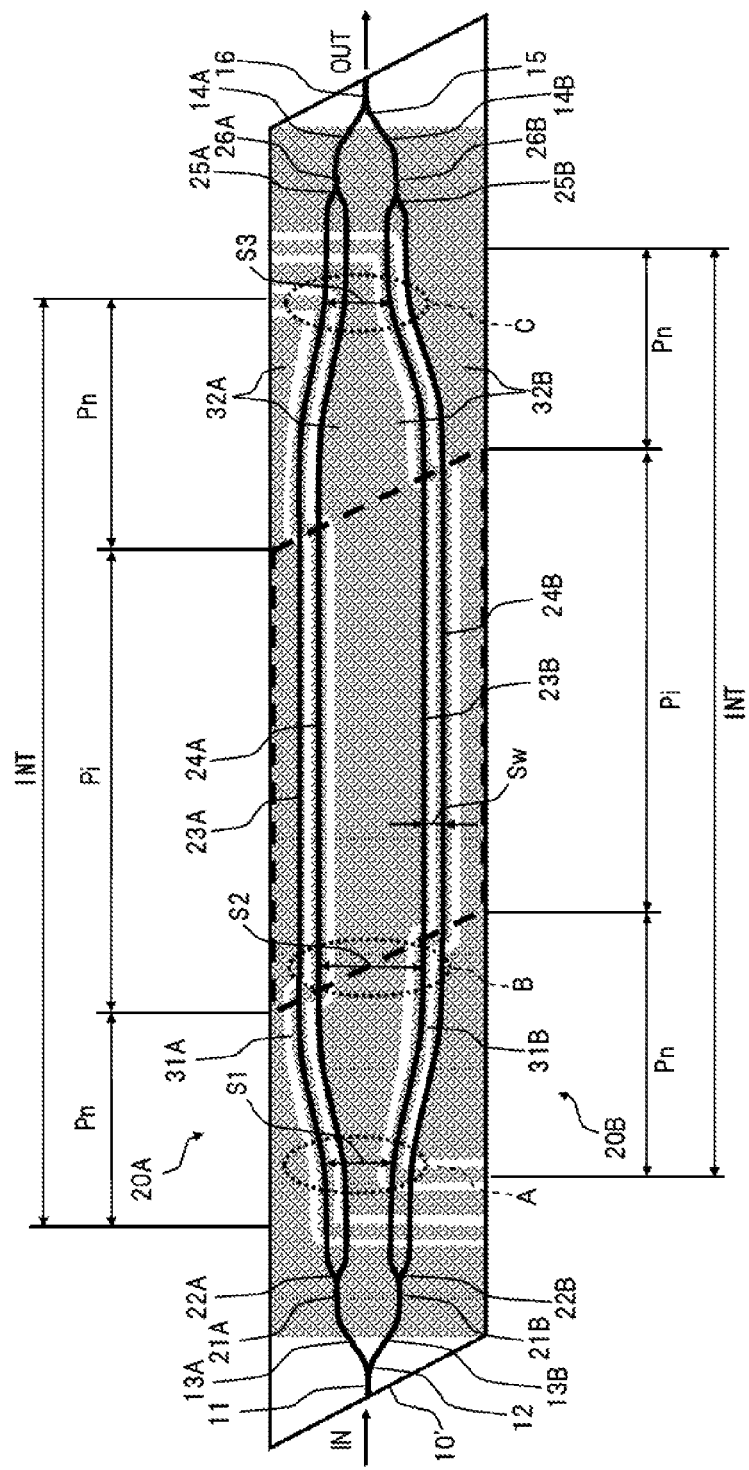
FIG. 6 is plan view illustrating a configuration of an optical modulator according to a second embodiment.

FIG. 6 is a plan view illustrating a configuration of an optical modulator according to the second embodiment. Parts the same as or corresponding to the configuration of the first embodiment illustrated in FIG. 4 are denoted by the same reference symbols and description is omitted. The same also applies for subsequent other embodiments.

In FIG. 6, the point where the configuration of the optical modulator of this embodiment is different to the case of the first embodiment, is that instead of the substrate 10, a substrate 10' is applied in which respective end faces where the input port IN and the output port OUT are respectively located are cut at an incline. The directions of the cuts of the respective end faces of the substrate 10' are the same as the direction of a parallelogram of the polarization inversion region Pi. Here the direction of the cuts of the respective end faces, and the direction of the two sides that face the respective end faces in the parallelogram of the polarization inversion region Pi are made parallel. The configuration other than that of the substrate 10' is the same as for the case of the first embodiment.

Figure 7:
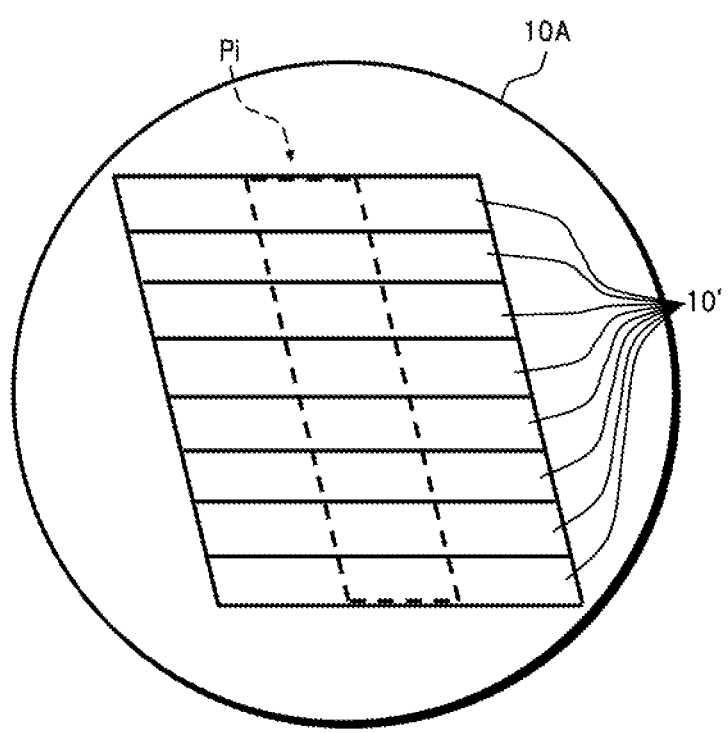
FIG. 7 shows an arrangement example for a case where a plurality of chips are cut out from a single wafer, in the second embodiment.

According to the optical modulator of the above described configuration, by cutting the respective end faces of the substrate 10' at an incline, it is possible to suppress reflection and optical feedback of the light input and output with respect to the present optical modulator. Furthermore, since the direction of the cuts of the respective end faces are parallel to the direction of the opposite sides of the parallelogram of the polarization inversion region Pi, then assuming the case where, as illustrated for example in FIG. 7, a plurality of substrates (chips) 10' are cut out from a single wafer 10A, continuity of the respective chips that are adjacent on the wafer 10A is improved. Therefore, a plurality of optical modulators can be easily constructed, and mass production of the optical modulator and a reduction in manufacturing cost becomes possible.

Next is a description of a third embodiment.

In the above described first and second embodiments, for the pair of branching waveguides of the optical modulation sections 20A and 20B, by applying a curved waveguide of a gentle approximate S shape to the portion located within the respective non-polarization inversion regions Pn on the input and the output side, the spacing between the optical modulation sections 20A and 20B is not narrowed in the vicinity of the border of the polarization inversion. In this configuration, in the case where the length in the lengthwise direction of the substrate 10, of the respective non-polarization inversion regions Pn is short, the radii of curvature of the curved waveguides of these portions become small so that there is the possibility of an increase in the bend loss. Therefore, in the third embodiment, an application example is described to address to the above case.

Figure 8:
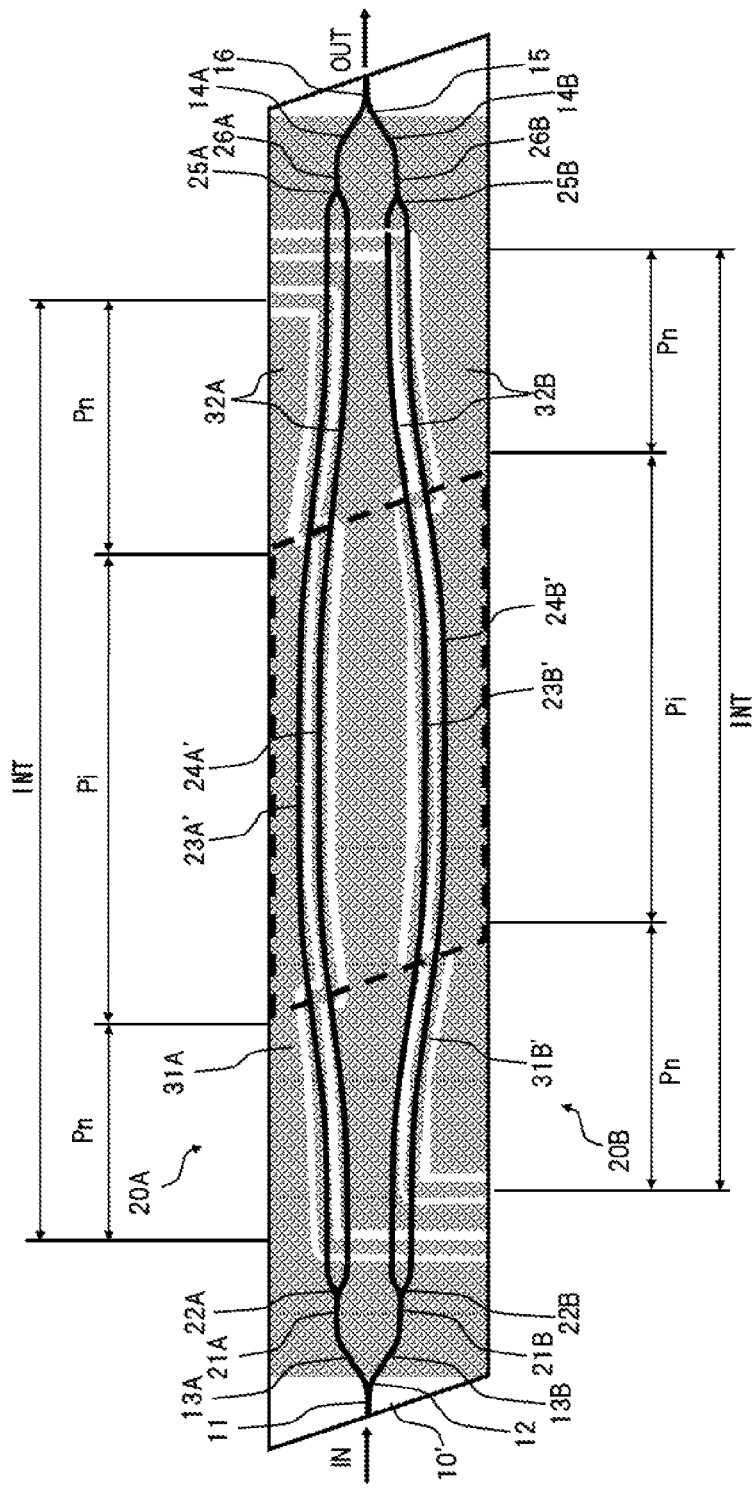
FIG. 8 is a plan view illustrating a configuration of an optical modulator according to the third embodiment.

FIG. 8 is a plan view illustrating a configuration of an optical modulator according to the third embodiment.

In FIG. 8, in the optical modulator of this embodiment, for the pair of branching waveguides 23A', 24A', 23B', and 24B' of the respective optical modulation sections 20A and 20B, curved waveguides are also applied to the portion located within the polarization inversion region Pi. As a result, the situation where the radii of curvature of the portions located within the respective non-polarization inversion regions Pn on the input side and the output side become small, is avoided. In this embodiment, a configuration is illustrated where signal electrodes 31A and 31B' of a similar pattern to in the modified example of the first embodiment illustrated in FIG. 5, are applied to the respective optical modulation sections 20A and 20B, and a substrate 10' of an incline cut similar to the second embodiment illustrated in FIG. 6, is applied.

More specifically, in the respective branching waveguides 23A' and 24A' of the optical modulation section 20A, the part located between from one end connected to the optical branching section 22A to the border of the polarization inversion on the input side, and the part located between from the border of the polarization inversion on the output side to the other end connected to the optical multiplexing section 25A, become gentle approximate S shape curved waveguides similar to the aforementioned cases of the first and second embodiments. Furthermore, regarding the portion located inside the polarization inversion region Pi, the direction of the curve of the waveguide before and after the border of the polarization inversion on the input side is changed, and the direction of the curve of the waveguide before and after the border of the polarization inversion on the output side is also changed, thus giving a curved waveguide that is gently curved to the upper side in the figure.

In the respective branching waveguides 23B' and 24B' of the optical modulation section 20B, the part located between from one end connected to the optical branching section 22B to the border of the polarization inversion on the input side, and the part located between from the border of the polarization inversion on the output side to the other end connected to the optical multiplexing section 25B, become gentle approximate S shape curved waveguides similar to the aforementioned cases of the first and second embodiments. Furthermore, regarding the portion located inside the polarization inversion region Pi, the direction of the curve of the waveguide before and after the border of the polarization inversion on the input side is changed, and the direction of the curve of the waveguide before and after the border of the polarization inversion on the output side is also changed, thus giving a curved waveguide that is gently curved to the lower side in the figure.

According to the optical modulator of the above described configuration, even in the case where the length of the respective non-polarization inversion regions Pn on the input side and output side are short, by making the portions located inside the polarization inversion region Pi of the respective branching waveguides 23A', 24A', 23B', and 24', curved waveguides that are curved up and down, the radii of curvature of the curved waveguides of approximate S shapes located inside the non-polarization inversion regions Pn can be made large. Therefore it becomes possible to reduce the bend loss (radiation loss) in each of the branching waveguides.

Next is a description of a fourth embodiment.

Figure 9:
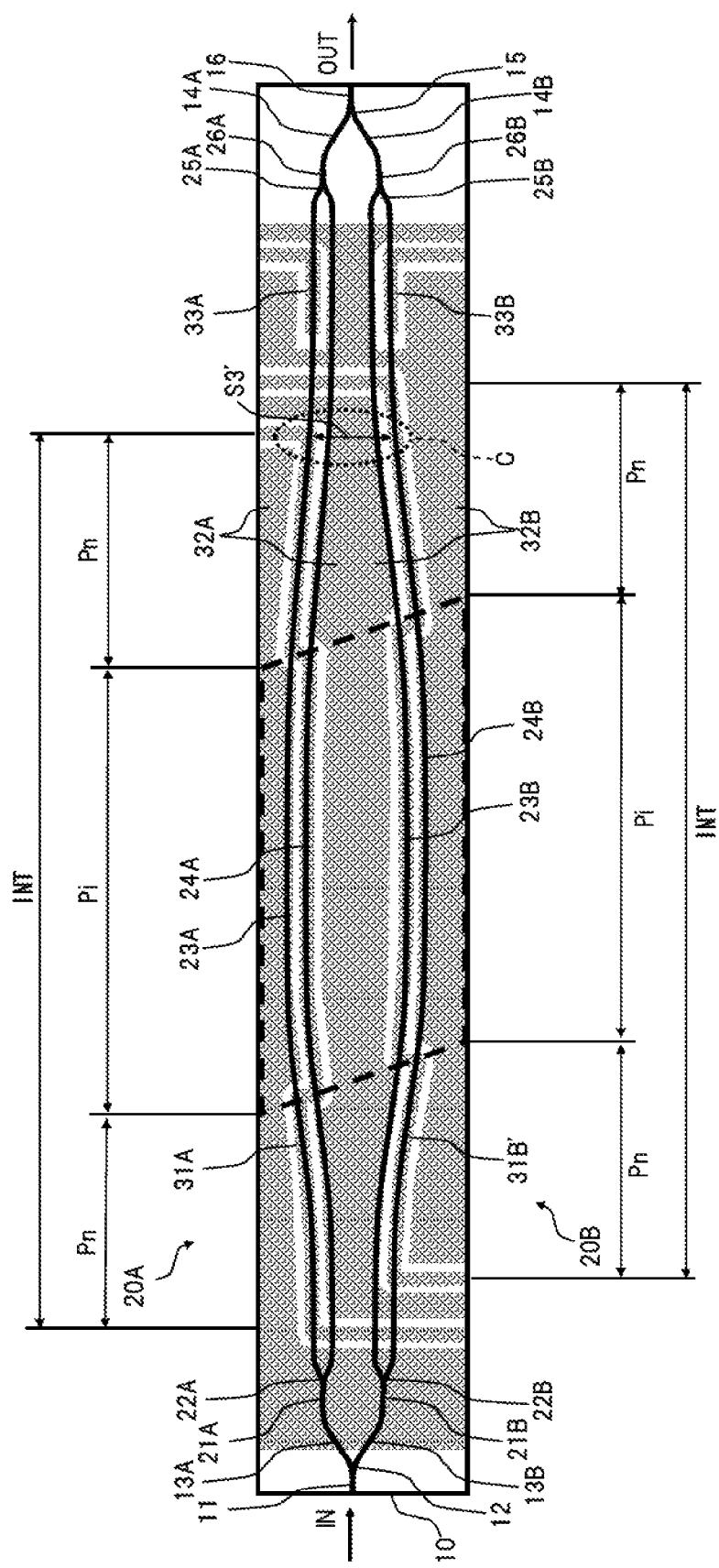
FIG. 9 is a plan view illustrating a configuration of an optical modulator according to a fourth embodiment.

FIG. 9 is a plan view illustrating a configuration of an optical modulator according to the fourth embodiment.

In FIG. 9, in the optical modulator of this embodiment, for example for the modified example of the first embodiment illustrated in FIG. 5, DC electrodes 33A and 33B are provided separate to the signal electrodes 31A and 31B' of the respective optical modulation sections 20A and 20B, and by adjusting the bias voltage applied to the DC electrodes 33A and 33B, the voltage to switch off the optical output of the respective optical modulation sections 20A and 20B is held constant.

Regarding the branching waveguides 23A, 24A, 23B, and 24B of the respective optical modulation sections 20A and 20B, in order to arrange the abovementioned DC electrodes 33A and 33B between the finish point of the interaction portion INT and the optical multiplexing sections 25A and 25B, these are each extended on the output side. To the part positioned inside the polarization inversion region Pi of the respective branching waveguides 23A, 24A, 23B and 24B, a curved waveguide similar to the case of the aforementioned third embodiment illustrated in FIG. 8 is applied, however this part may be a linear waveguide.

The respective DC electrodes 33A and 33B are formed along directly above the extension portions of the branching waveguides 23A and 24B, and one end of each is taken out as far as the side face of the substrate 10. The earth electrodes 32A and 32B extend to the output side corresponding to the DC electrodes 33A and 33B, and are separated from the DC electrodes 33A and 33B, and include the portions along directly above the respective branching waveguides 24A and 23B.

In the optical modulator of the above described configuration, for example the intensities of the signal lights that are each modulated by the optical modulation sections 20A and 20B, are monitored using an output monitor or the like (not illustrated in the figure), and a bias voltage applied to the DC electrodes 33A and 33B corresponding to the monitor result, is feedback controlled to thereby keep the voltage for switching off the optical output of the optical modulation sections 20A and 20B constant.

At this time, even if the DC electrodes 33A and 33B are arranged on the output side of the interaction portion INT of the respective optical modulation sections 20A and 20B, since the DC electrodes 33A and 33B along the branching waveguides 23A and 24B are in a curved shape, the spacing S3' of the signal electrodes 31A and 31B' in the vicinity of the finish point C of the interaction portion INT becomes greater than the spacing of the DC electrodes 33A and 33B. If the spacing S3' satisfies the aforementioned necessary conditions for the spacing of the signal electrode, cross talk can be prevented, and hence the spacing of the optical modulation sections 20A and 20B in the vicinity of the respective optical multiplexing sections 25A and 25B becomes narrower than for the case of the aforementioned modified example of the first embodiment.

Therefore, it is possible to increase the radii of curvature of the curved waveguides 14A and 14B for guiding the output light of the respective optical modulation sections 20A and 20B to the optical multiplexing section 15. If the radii of curvature of the curved waveguides 14A and 14B are made a maximum, the radii of curvature of the portions positioned below the signal electrodes 31A and 31B' of the branching waveguides 23A and 24B (the range from the border of the polarization inversion on the output side to the finish point of the interaction portion INT), and the radii of curvature of the portions positioned below the DC electrodes 33A and 33B of the branching waveguides 23A and 24B may be made equal.

Figure 10:
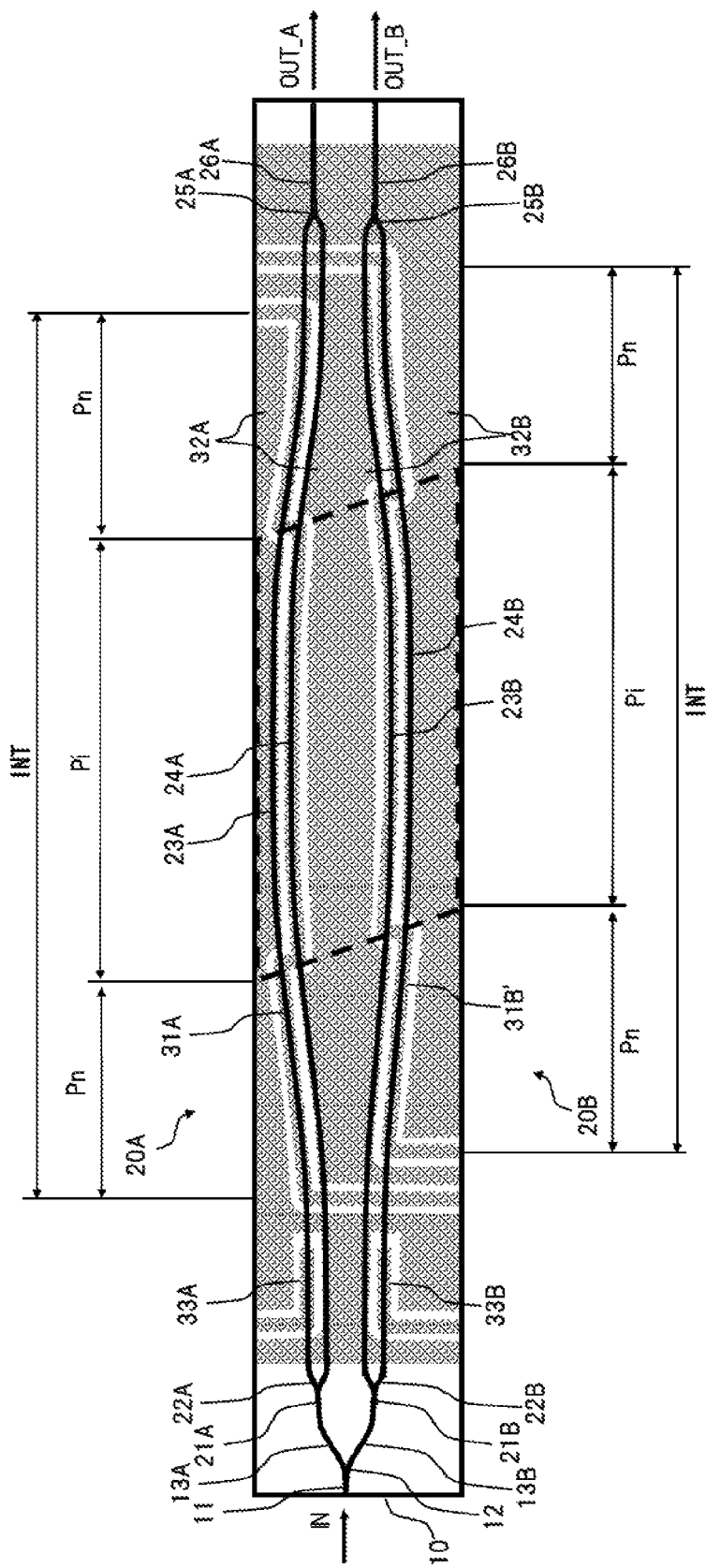
FIG. 10 is a plan view illustrating a configuration of a modified example related to the fourth embodiment.

In the above fourth embodiment, an example is illustrated for where the DC electrodes 33A and 33B are located between the finish point of the interaction portion INT and the optical multiplexing sections 25A and 25B. However the DC electrodes 33A and 33B may be located between the optical branching sections 22A and 22B of the optical modulation sections 20A and 20B and the start point of the interaction portion INT. Such a configuration, for example as illustrated in FIG. 10, is suitable for the case where it is not necessary to multiplex the output light of the optical modulation sections 20A and 20B into one. In the case where the DC electrodes 33A and 33B are located on the input side, the branching waveguides 23A, 24A, 23B, and 24B of the respective optical modulation sections 20A and 20B are each extended to the input side. The DC electrodes 33A and 33B are formed along directly above the extension portion of the respective branching waveguides 23A and 24B. In this case, the spacing 51' of the signal electrodes 31A and 31B' in the vicinity of the start point A of the interaction portion INT is wider than the spacing of the respective DC electrodes 33A and 33B. Therefore it is possible to increase the radii of curvature of the curved waveguides 13A and 13B for guiding the input light that has been bifurcated by the optical branching section 12 to the respective optical modulation sections 20A and 20B.

Furthermore, in the fourth embodiment, an example has been described for where the DC electrode is provided for the modified example of the first embodiment illustrated in FIG. 5. However it is similarly possible to also provide the DC electrode for the abovementioned other embodiments and modified examples.

Next is a description of a fifth embodiment.

In the abovementioned first through fourth embodiments, the description was for an optical modulator with two optical modulation sections arranged in parallel on a single substrate. However the present invention is also applicable to a parallel arrangement of 2×N optical modulation sections where N is an integer of one or more. Therefore, in the fifth embodiment, an application example is described for where, for example four (N=2) optical modulation sections are arranged in parallel on the same substrate.

Figure 11:
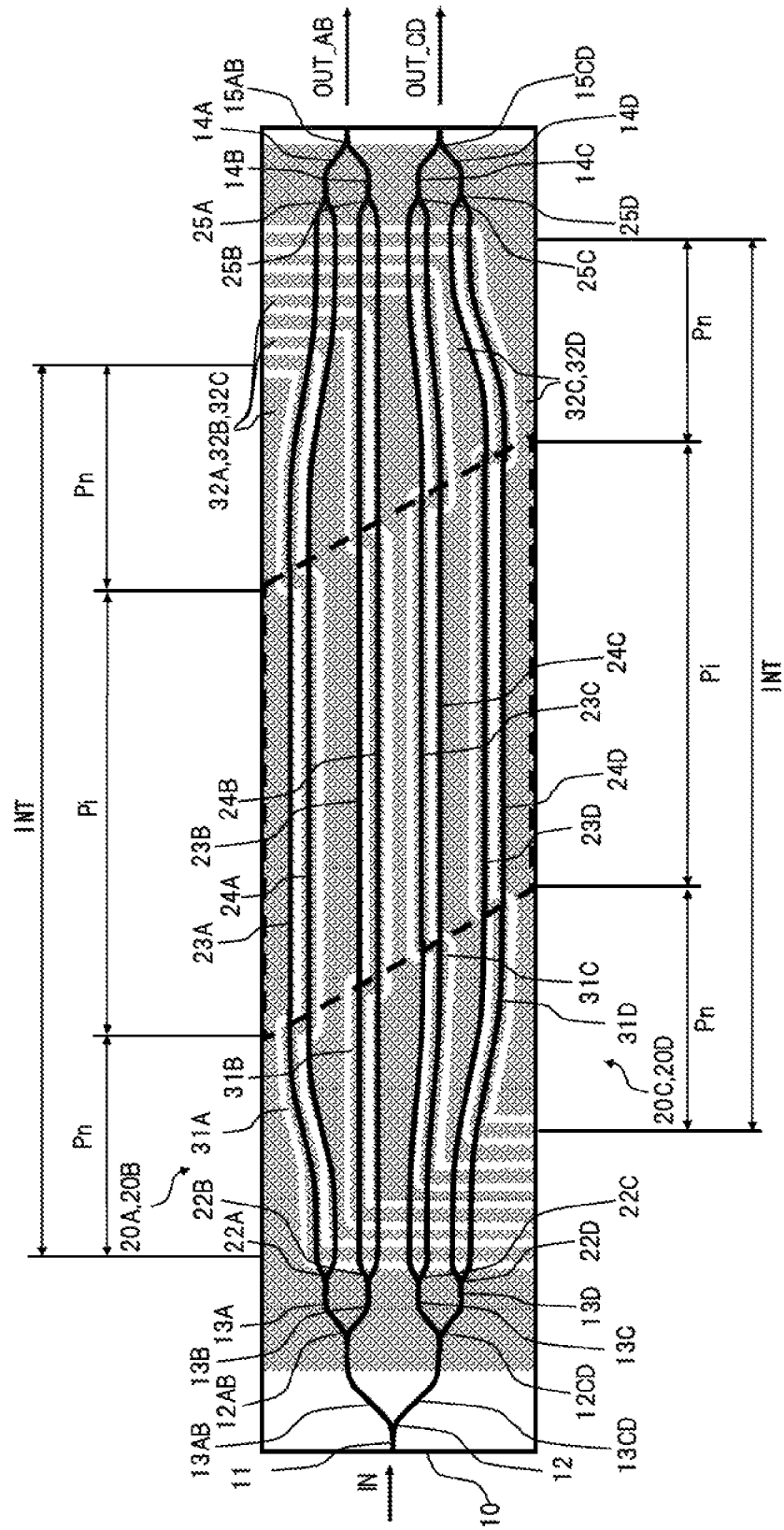
FIG. 11 is a plan view illustrating a configuration of an optical modulator according to a fifth embodiment.

FIG. 11 is a plan view illustrating a configuration of an optical modulator according to the fifth embodiment.

In FIG. 11 four optical modulations sections 20A, 20B, 20C, and 20D are arranged in parallel on a single crystal substrate 10 having an electro-optic effect. For the substrate 10, similar to the case of the first embodiment, a Z-cut crystal that is cut out in a rectangle shape is used, and a polarization inversion region Pi that has a shape of a parallelogram is formed on a central portion in the longitudinal direction thereof.

The optical modulator is provided with one input port IN and two output ports OUT_AB, OUT_CD, and one end of a single input waveguide 11 is connected to the input port IN. The other end of the input waveguide 11 is connected to an input end of an optical branching section 12, and to the two output ends of the optical branching section 12 are respectively connected input ends of optical modulation sections 12AB and 12CD via curved waveguides 13AB and 13CB. To the two output ends of the optical branching section 12AB are respectively connected the input ends of the optical modulation sections 20A and 20B via the curved waveguides 13A and 13B. To the two output ends of the optical branching section 12CD are respectively connected the input ends of the optical modulation sections 20C and 20C via the curved waveguides 13C and 13D. The optical branching sections 12, 12AB, and 12CD branch the input light into two at a required intensity ratio and output this.

Figure 1:
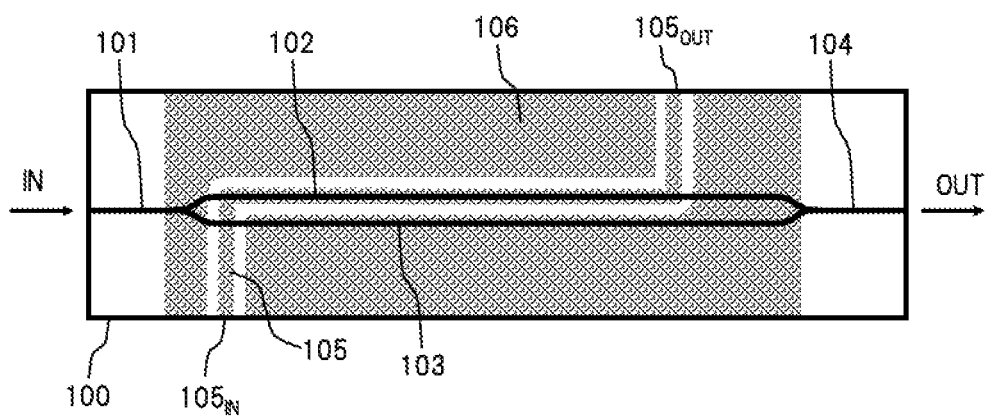
FIG. 1 is a plan view illustrating a configuration example of a general Mach-Zehnder type optical modulator.
Figure 2:
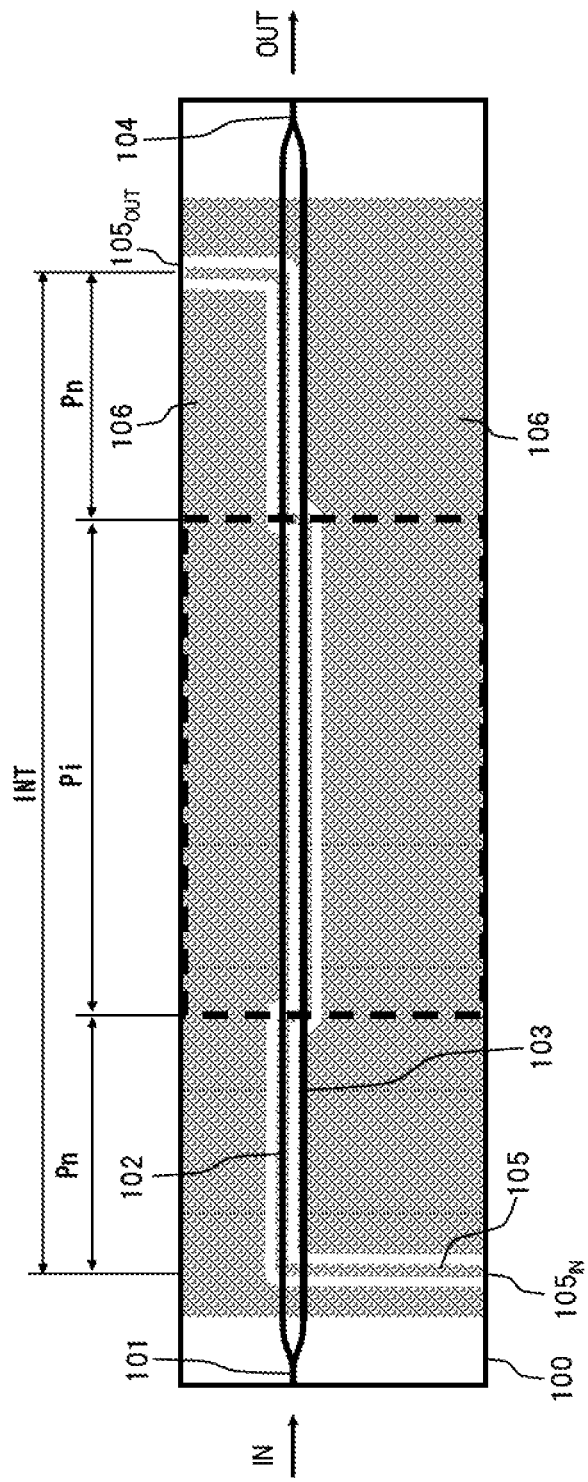
FIG. 2 is a plan view illustrating a configuration example of a conventional optical modulator that includes a polarization inversion region.

The optical modulation section 20A located at the topmost stage in the figure, has a configuration similar to the optical modulation section 20A of the first embodiment illustrated in FIG. 4. The second stage optical modulation section 20B has a configuration similar to the aforementioned conventional optical modulator illustrated in FIG. 2, in which the pair of branching waveguides 23B and 24B are linear waveguides that span the whole of the polarization inversion region Pi and the non-polarization inversion region Pn.

The signal electrodes 31A and 31B of the respective optical modulation sections 20A and 20B are formed along directly above the branching waveguides 23A and 23B within the non-polarization inversion region Pn on the input side, and are shifted from the branching waveguides 23A and 23B side to the branching waveguides 24A and 24B side in the boundary portion between the non-polarization inversion region Pn and the polarization inversion region Pi on the input side, and are formed along directly above the branching waveguides 24A and 24B within the polarization inversion region Pi. Furthermore, the signal electrodes 31A and 31B, in the boundary portion between the polarization inversion region Pi and the non-polarization inversion region Pn on the output side, are shifted from the branching waveguides 24A and 24B side to the branching waveguides 23A and 23B side, and are formed along directly above the branching waveguides 23A and 23B within the non-polarization inversion region Pn on the output side.

The earth electrodes 32A and 32B of the respective optical modulation sections 20A and 20B are separated from the signal electrodes 31A and 31B, and also are formed to include the portions along directly above the branching waveguides 23A and 23B within the polarization inversion region Pi, and the portions along directly above the branching waveguides 23A and 23B within the respective non-polarization inversion regions Pn on the input side and the output side. Here the respective earth electrodes 32A and 32B formed between the branching waveguide 24A of the optical modulation section 20A and the branching waveguide 23B of the optical modulation section 20B, are common.

The output ends of the respective optical modulation sections 20A and 20B are connected to the two input ends of the optical multiplexing section 15AB via the curved waveguides 14A and 14B. The optical multiplexing section 15AB multiplexes each of the signal lights that have been modulated by the respective optical modulation sections 20A and 20B, into one. To the output end of the optical multiplexing section 15AB is connected the output port OUT_AB.

The third and fourth stage optical modulation sections 20C and 20D are the same configuration as the aforementioned optical modulation section 20B in the modified example of the first embodiment illustrated in FIG. 5. However, the radii of curvature of the curved parts of approximate S shapes of the respective branching waveguides 23D and 24D in the optical modulation section 20D are greater than the radii of curvature of the curved parts of approximate S shapes of the respective branching waveguides 23C and 24C in the optical modulation section 20C.

The signal electrodes 31C and 31D of the respective optical modulation sections 20C and 20D are formed along directly above the branching waveguides 24C and 24D within the non-polarization inversion region Pn on the input side, and are shifted from the branching waveguides 24C and 24D side to the branching waveguides 23C and 23D side in the boundary portion between the non-polarization inversion region Pn and the polarization inversion region Pi on the input side, and are formed along directly above the branching waveguides 23C and 23D within the polarization inversion region Pi. Furthermore, the signal electrodes 31C and 31D, in the boundary portion between the polarization inversion region Pi and the non-polarization inversion region Pn on the output side, are shifted from the branching waveguides 23C and 23D side to the branching waveguides 24C and 24D side, and are formed along directly above the branching waveguides 24C and 24D within the non-polarization inversion region Pn on the output side.

The earth electrodes 32C and 32D of the respective optical modulation sections 20C and 20D are separated from the signal electrodes 31C and 31D, and also are formed to include the portions along directly above the branching waveguides 24C and 24D within the polarization inversion region Pi, and the portions along directly above the branching waveguides 23C and 23D within the respective non-polarization inversion regions Pn on the input side and the output side. Here the earth electrode 32C formed between the aforementioned branching waveguide 24B of the optical modulation section 20B and the branching waveguide 23C of the optical modulation section 20C, is common with the earth electrode 32B of the optical modulation section 20B. Furthermore the respective earth electrodes 32C and 32D formed between the branching waveguide 24C of the optical modulation section 20C and the branching waveguide 23D of the optical modulation section 20D are common.

The output ends of the respective optical modulation sections 20C and 20D are connected to the two input ends of the optical multiplexing section 15CD via the curved waveguides 14C and 14D. The optical multiplexing section 15CD multiplexes each of the signal lights that have been modulated by the respective optical modulation sections 20C and 20D, into one. To the output end of the optical multiplexing section 15CD is connected the output port OUT_CD.

In the optical modulator of the above configuration, the branching waveguides 23A and 24A of the optical modulation section 20A become separated from the branching waveguides 23B and 24B of the optical modulation section 20B, with approach from the vicinity of the start point of the interaction portion INT to the vicinity of the border of the polarization inversion on the input side, and the spacing of the signal electrodes 31A and 31B in the vicinity of the border of the polarization inversion on the input side becomes greater than the spacing in the vicinity of the start point of the interaction portion INT. Furthermore, the branching waveguides 23A and 24A of the optical modulation section 20A approach to the branching waveguides 23B and 24B of the optical modulation section 20B, with approach from the vicinity of the border of the polarization inversion on the output side to the vicinity of the finish point of the interaction portion INT, and the spacing of the signal electrodes 31A and 31B in the vicinity of the border of the polarization inversion on the output side becomes greater than the spacing in the vicinity of the finish point of the interaction portion INT. As a result, each of the radii of curvature of the curved waveguides 13A and 13B on the input side and the curved waveguides 14A and 14B on the output side can be made large.

Moreover, the branching waveguides 23D and 24D of the optical modulation section 20D become separated from the branching waveguides 23C and 24C of the optical modulation section 20C, with approach from the vicinity of the start point of the interaction portion INT to the vicinity of the border of the polarization inversion on the input side, and the spacing of the signal electrodes 31C and 31D in the vicinity of the border of the polarization inversion on the input side becomes greater than the spacing in the vicinity of the start point of the interaction portion INT. Furthermore, the branching waveguides 23D and 24D of the optical modulation section 20D approach to the branching waveguides 23C and 24C of the optical modulation section 20C, with approach from the vicinity of the border of the polarization inversion on the output side to the vicinity of the finish point of the interaction portion INT, and the spacing of the signal electrodes 31C and 31D in the vicinity of the border of the polarization inversion on the output side becomes greater than the spacing in the vicinity of the finish point of the interaction portion INT. As a result, each of the radii of curvature of the curved waveguides 13C and 13D on the input side and the curved waveguides 14C and 14D on the output side can be made large.

In addition, the branching waveguides 23C and 24C of the optical modulation section 20C become separated from the branching waveguides 23B and 24B of the optical modulation section 20B, with approach from the vicinity of the start point of the interaction portion INT to the vicinity of the border of the polarization inversion on the input side, and the spacing of the signal electrodes 31B and 31C in the vicinity of the border of the polarization inversion on the input side becomes greater than the spacing in the vicinity of the start point of the interaction portion INT. As a result, the respective radii of curvature of the curved waveguides 13AB and 13CD on the input side can also be made large.

According to the optical modulator of the above described present embodiment, even in the case where four optical modulation sections 20A to 20D are arranged in parallel on the substrate 10 that includes the polarization inversion region Pi, common input light can be applied at low loss to the respective optical modulation sections 20A to 20D of a small size configuration, so that it is possible to generate signal light in which wavelength chirp has been reduced, at low cost.

In the above fifth embodiment, the example is shown for where the signal light that is multiplexed by the optical multiplexing sections 15AB and 15CD is separately output from two output ports OUT_AB and OUT_CD. However the output light of the optical multiplexing sections 15AB and 15CD may be applied to an optical modulator via a separately provided curved waveguide and multiplexed, and output from a single output port. Furthermore, the configuration is shown for where the pair of branching waveguides 23B and 24B of the optical modulation section 20B are linear waveguides. However curved waveguides of an approximate S shape may be applied to the input side and output side of the respective branching waveguides 23B and 24B. In this case, the radii of curvature of the curved portions in the branching waveguides 23A and 24A of the optical modulation section 20A are made greater than the radii of curvature of the curved portions in the branching waveguide 23B and 24B of the optical modulation section 20B.

Furthermore, in relation to the above described optical modulators of the respective embodiments, the pattern shape in the vicinity of the input end of the signal electrode of the optical modulation sections (for example, the electrode pad or the curve of the electrode or the like) is constrained, and there are cases where it is difficult to arrange the central axes that are parallel with the longitudinal direction of the substrate for all of the MZ type optical waveguides of the respective optical modulation sections, in the vicinity of the longitudinal central axis of the substrate. In these cases, for example, the spacing of the branching waveguides of the adjacent optical modulation section within the non-polarization inversion region on the input side may be made wide similar to the aforementioned respective embodiments, and the central axes of the branching waveguides of the optical modulation sections may be shifted in a direction perpendicular to the longitudinal direction. However, at this time, making the length of the branching waveguides of the optical modulation sections the same, becomes a problem.

Figure 12:
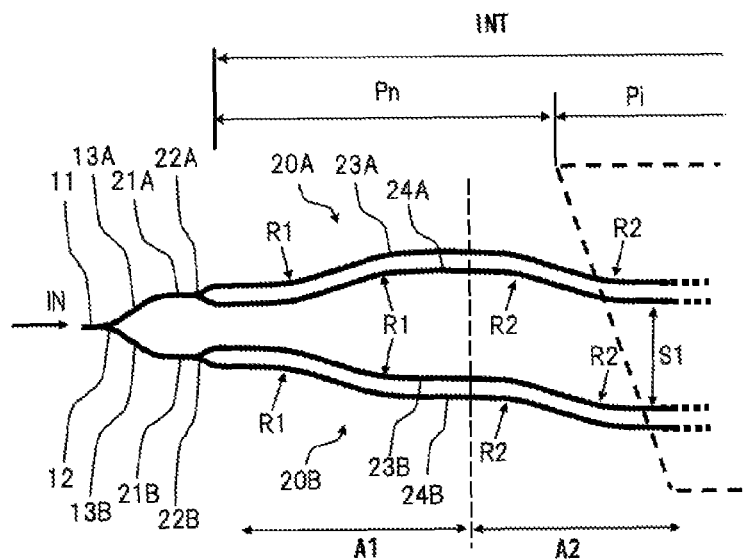
FIG. 12 shows an application example of an optical waveguide pattern related to the first through fifth embodiments.

To deal with the above problem, as illustrated for example in the optical waveguide pattern of FIG. 12, the region from the start point of the interaction portion INT up to the border of the polarization inversion on the input side, may be separated into two along the longitudinal direction of the substrate, so that in the first half region A1, the spacing between the branching waveguides of the optical modulation sections 20A and 20B is widened, and in the later half region A2, the branching waveguides of the optical modulation sections 20A and 20B are made curved waveguides of a gentle approximate S shape so as to be shifted in the same direction. In this optical waveguide pattern, if the radii of curvature R1 of the curved waveguides inside the region A1 are made equal to the radii of curvature R2 of the curved waveguides inside the region A2 (R1=R2), the radii of curvature can be made the greatest. By making the lengths of the branching waveguides of the optical modulation sections 20A and 20B the same in this manner, it becomes possible to realize a high extinction ratio.

Figure 13:
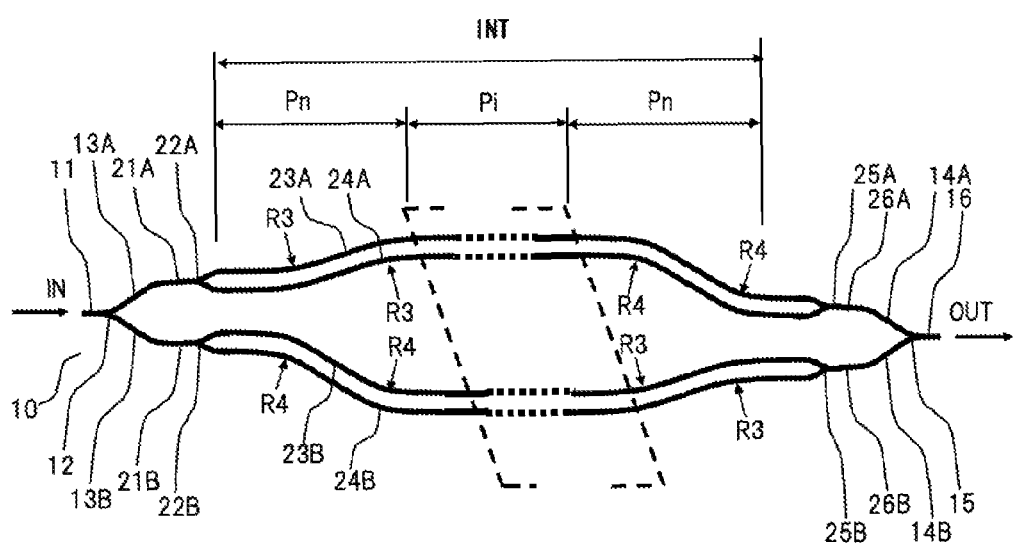
FIG. 13 shows another application example of an optical waveguide pattern related to the first through fifth embodiments.

Furthermore, as another method for making the lengths of the branching waveguides of the optical modulation sections 20A and 20B the same, for example as illustrated in the optical waveguide pattern of FIG. 13, in the region from the start point of the interaction portion INT up to the border of the polarization inversion on the input side, the radii of curvature of the branching waveguides 23A and 24A of the respective optical modulation sections 20A are made R3, and the radii of curvature of the branching waveguides 23B and 24B of the respective optical modulation sections 20B are made R4 different to R3. On the other hand, in the region from the border of the polarization inversion on the output side up to the start point of the interaction portion INT, the radii of curvature of the branching waveguides 23A and 24A of the respective optical modulation sections 20A are made R4, and the radii of curvature of the branching waveguides 23B and 24B of the respective optical modulation sections 20B are made R3. Also by applying this optical waveguide pattern, the length of each of the branching waveguides can be made the same while shifting the central axes of the MZ type optical waveguides of the respective optical modulation sections 20A and 20B in the same direction.

Furthermore, in the above described respective embodiments, the shape of the polarization inversion region Pi is made a parallelogram, and the polarization inversion region Pi is arranged on the approximate longitudinal center of the respective optical modulation sections. However the present invention is not limited to this. For example, in the case where lengthwise displacement of the adjacent optical modulating sections is large, so that the polarization inversion region Pi cannot be arranged on the approximate longitudinal center of the respective optical modulation sections by only making the polarization inversion region Pi a parallelogram, manufacturability of the optical modulator becomes poor. However it is also possible to apply the invention to where the shape of the polarization inversion region Pi is a polygon shape of five or more angles, a shape surrounded by a curve, or where the polarization inversion region Pi is divided corresponding to the number of optical modulators.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator comprising at least two optical modulation sections which are arranged in parallel on a same substrate having an electro-optic effect, in the respective optical modulation sections, a Mach-Zehnder type optical waveguide is formed on the substrate, and a signal electrode and an earth electrode are provided along a pair of branching waveguides that are disposed between an optical branching section and an optical multiplexing section of the Mach-Zehnder type optical waveguide, that perform modulation of light that propagates on the Mach-Zehnder type optical waveguide by applying an electric signal corresponding to modulation data to the signal electrode that is a travelling wave electrode, wherein:

the substrate, in the respective optical modulation sections, has in an interaction portion in which light propagating on the pair of branching waveguides and an electrical signal propagating on the signal electrode interact with each other, and a polarization inversion region in which a polarization direction in one region is inverted with respect to a polarization direction in the other region;

in the respective optical modulation sections, respective branch lights for where light input to one input port that is common to both is branched into a plurality, are guided to an input end of the Mach-Zehnder type optical waveguide via curved optical waveguides corresponding to each of the optical modulation sections;

the signal electrodes of the respective optical modulation sections are respectively arranged, within a polarization inversion region of the interaction portion, on one branching waveguide out of the pair of branching waveguides, and within a non-polarization inversion region in which there is no polarization inversion in the interaction portion, on an other branching waveguide; and for each of the pair of branching waveguides of the respective optical modulation sections, for a spacing to a pair of branching waveguides of the other optical modulation section that is adjacent on the substrate, a spacing in the vicinity of a border on an input side between the polarization inversion region and the non-polarization inversion region is wider than a spacing in the vicinity of a start point of the interaction portion.

2. An optical modulator according to claim 1, wherein for each of the signal electrodes of the optical modulation sections, for a spacing to the signal electrode of the adjacent other optical modulation section on the substrate, a spacing in the vicinity of a border on the input side, of the polarization inversion region and the non-polarization inversion region, is wider than a spacing in the vicinity of a start point of the interaction portion.

3. An optical modulator according to claim 1, wherein for each of the pair of branching waveguides of the respective optical modulation sections, for a spacing to the pair of branching waveguides of the other optical modulation section that is adjacent on the substrate, a spacing in the vicinity of a border on an output side between the polarization inversion region and the non-polarization inversion region is wider than a spacing in the vicinity of a finish point of the interaction portion.

4. An optical modulator according to claim 3, wherein for each of the signal electrodes of the optical modulation sections, for a spacing to the signal electrode of the adjacent other optical modulation section on the substrate, a spacing in the vicinity of a border on the output side, of the polarization inversion region and the non-polarization inversion region, is wider than a spacing in the vicinity of a finish point of the interaction portion.

5. An optical modulator according to claim 1, wherein the polarization inversion region has a shape where positions of the border with the non-polarization inversion region in the adjacent optical modulation sections on the substrate, are displaced in the longitudinal direction of the substrate on both an input side and an output side.

6. An optical modulator according to claim 5, wherein the polarization inversion region is a parallelogram shape.

7. An optical modulator according to claim 1, wherein the pair of branching waveguides of each optical modulation section each comprise a first branching waveguide and a second branching waveguide that is parallel to one side of the first branching waveguide, and a signal electrode of at least one of the optical modulation sections is arranged above the first branching waveguide within the polarization inversion region, and is arranged above the second branching waveguide within the non-polarization inversion region, and a signal electrode of the remaining optical modulation section is arranged on the second branching waveguide within the polarization inversion region, and is arranged on the first branching waveguide within the non-polarization inversion region.

8. An optical modulator accordingly to claim 1, wherein the substrate is cut at an incline on an end face where light is input.

9. An optical modulator according to claim 8, wherein the polarization inversion region is a parallelogram, and in the substrate, the direction of cut of the end face is the same as the direction of the parallelogram of the polarization inversion region.

10. An optical modulator according to claim 1, wherein in each of the pair of branching waveguides of the optical modulation sections, a portion located inside the non-polarization inversion region is a curved waveguide of an approximate S shape, and a portion located inside the polarization inversion region is a linear waveguide.

11. An optical modulator according to claim 1, wherein in each of the pair of branching waveguides of the optical modulation sections, a portion located inside the non-polarization inversion region is a curved waveguide of an approximate S shape, and a portion located inside the polarization inversion region is a curved waveguide in which a curve direction is changed before and after a border with the non-polarization inversion region.

12. An optical modulator according to claim 1, wherein in each of the optical modulation sections, in the portion where the signal electrode is not arranged on the pair of branching waveguides, there is provided a DC electrode that applies a bias voltage.

13. An optical modulator according to claim 12, wherein each DC electrode of the optical modulation sections is disposed from a finish point of the interaction section to a connection point with the optical multiplexing section of the Mach-Zehnder type optical waveguide, and is arranged along one of the branching waveguides of the pair of branching waveguides.

14. An optical modulator according to claim 12, wherein each DC electrode of the optical modulation sections is disposed between from a connection point with the optical branching section of the Mach-Zehnder type optical waveguide to a start point of the interaction portion, and is arranged along one of the branching waveguide of the pair of branching waveguides.

15. An optical modulator according to claim 1, wherein in each of the pair of branching waveguides of the optical modulation sections, in a part disposed from a start point of the interaction portion to a border on an input side, between the polarization inversion region and the non-polarization inversion region, in a region of former half of the part when divided into two, a spacing to the pair of branching waveguides of the adjacent other optical modulation section on the substrate is widened, and in a region of a later half, a center axis of the Mach-Zehnder type optical waveguide is shifted in one direction, so as to give a curved waveguide.

16. An optical modulator according to claim 1, wherein in the pair of branching waveguides of at least one of the optical modulation sections, a part disposed from a start point of the interaction portion to a border on an input side, between the polarization inversion region and the non-polarization inversion region, is a curved waveguide of an approximate S shape having a first radius of curvature, and a part disposed from a border on an output side, between the polarization inversion region and the non-polarization inversion region, to a finish point of the interaction portion is a curved waveguide of an approximate S shape having a second radius of curvature that is different from the first radius of curvature, and in the pair of branching waveguides of a remaining optical modulation section, a part disposed from a start point of the interaction portion to a border on an input side, between the polarization inversion region and the non-polarization inversion region, is a curved waveguide of an approximate S shape having the second radius of curvature, and a part disposed from a border on an output side, between the polarization inversion region and the non-polarization inversion region, to a finish point of the interaction portion is a curved waveguide of an approximate S shape having the first radius of curvature.

17. A light transmitting apparatus including an optical modulator according to claim 1, and a single light source, wherein output light of the light source is input to an input port of the optical modulator.

* * * * *